United States Patent [19]

Ettel et al.

[11] Patent Number: 4,677,376
[45] Date of Patent: Jun. 30, 1987

[54] APPARATUS FOR MEASURING THE MUZZLE VELOCITY OF A PROJECTILE FIRED FROM A WEAPON

[75] Inventors: Godwin Ettel, Glattbrugg; Heinz Maeder, Pfaffhausen; Robert Ramseyer, Versoix, all of Switzerland

[73] Assignee: Werkzeugmaschinenfabrik Oerlikon-Bührle AG, Zurich, Switzerland

[21] Appl. No.: 547,642

[22] Filed: Nov. 1, 1983

[30] Foreign Application Priority Data

Nov. 10, 1982 [CH] Switzerland ......................... 6533/82
Jul. 20, 1983 [CH] Switzerland ......................... 3955/83

[51] Int. Cl.⁴ .............................................. G01P 3/66
[52] U.S. Cl. .................................................. 324/179
[58] Field of Search ............. 324/179, 178; 336/84 R, 336/84 C; 368/108; 73/167

[56] References Cited

U.S. PATENT DOCUMENTS

| | | | |
|---|---|---|---|
| 2,958,037 | 10/1960 | Riede et al. | 336/84 R |
| 4,228,397 | 10/1980 | Schmidt | 324/179 |
| 4,342,961 | 8/1982 | Zimmermann et al. | 324/179 |
| 4,483,190 | 11/1984 | Cornett | 324/179 |

FOREIGN PATENT DOCUMENTS

| | | |
|---|---|---|
| 449432 | 4/1943 | Belgium . |
| 2038783 | 3/1971 | Fed. Rep. of Germany . |
| 1156907 | 12/1957 | France . |
| 1390791 | 1/1965 | France . |

*Primary Examiner*—Reinhard J. Eisenzopf
*Assistant Examiner*—Jack B. Harvey
*Attorney, Agent, or Firm*—Werner W. Kleeman

[57] ABSTRACT

The apparatus for measuring the muzzle velocity $V_0$ of a projectile fired from a weapon enables eliminating the effects of interfering magnetic fields, particularly that of the terrestrial magnetic field. For this purpose the apparatus comprises a shielding arrangement for shielding or screening interfering magnetic fields. Such measuring apparatus contains two induction coils and a support for the attachment thereof which is made of a material of low magnetic permeability. For shielding or screening the interfering magnetic fields there is used a shielding arrangement made of a material of high magnetic permeability. The apparatus is simultaneously constructed as a muzzle brake and is suitable for measuring the muzzle velocity of sabot projectiles.

6 Claims, 5 Drawing Figures

APPARATUS FOR MEASURING THE MUZZLE VELOCITY OF A PROJECTILE FIRED FROM A WEAPON

CROSS REFERENCE TO RELATED APPLICATION

This application is related to the commonly assigned, co-pending U.S. application Ser. No. 235,660, filed Feb. 17, 1981, entitled "Apparatus For Measuring the Muzzle Velocity V-null of a Projectile Fired from a Weapon", now U.S. Pat. No. 4,342,961, granted Aug. 3, 1982.

BACKGROUND OF THE INVENTION

The present invention relates to a new and improved apparatus for measuring the muzzle velocity of a projectile fired out of a weapon.

In its more specific aspects the invention relates to a new and improved apparatus for measuring the muzzle velocity of a projectile fired out of a firing weapon, such apparatus being mounted at the mouth or muzzle of the weapon barrel and comprises at least one measuring coil which is arranged such that the measuring coil axis coincides with the lengthwise axis of the weapon barrel.

Such apparatuses for measuring the muzzle velocity of projectiles are known to the art. Most of the known apparatuses, however, have the disadvantage that they are unsuited for measuring the muzzle velocity of sabot type projectiles. The sabot of such a sabot projectile disintegrates upon its exit out of the weapon barrel muzzle. The disintegrated parts of the sabot then impact against the measuring coils and damage the $V_0$-measuring apparatus, or else at least tend to interfere with a precise measurement of the muzzle velocity.

SUMMARY OF THE INVENTION

Therefore, with the foregoing in mind it is a primary object of the present invention to provide a new and improved apparatus for measuring the muzzle velocity of a projectile fired out of a weapon, which measuring apparatus is also suitable for measuring the muzzle velocity of sabot projectiles.

Another important object of the present invention is directed to the provision of a new and improved apparatus for measuring the muzzle velocity of a projectile fired out of a weapon, which is suitable for measuring the muzzle velocity of sabot projectiles and can be mounted, for this purpose, as closely as possible to the muzzle of the weapon barrel.

Still a further significant object of the present invention is directed to a new and improved construction of an apparatus for measuring the muzzle velocity of a projectile fired out of a weapon which is structured in such a manner as to simultaneously serve as a muzzle brake.

Another important object of the present invention is directed to a new and approved construction of an apparatus for measuring the muzzle velocity of a projectile fired out of a weapon, which apparatus is shielded from interfering magnetic fields and, in particular, from the terrestrial magnetic field.

Still another important object of the present invention is directed to a new and improved construction of an apparatus for measuring the muzzle velocity of a projectile fired out of a weapon, which is also suitable for measuring the muzzle velocity of sabot projectiles, and wherein the measuring coils of the measuring apparatus are dimensioned such that the disintegration or detachment of the sabot of the sabot projectile already can occur during the actual measurement operation.

Since in such an arrangement the measuring apparatus is exposed to the propellant gases which exit from the muzzle of the weapon barrel and which gases are very hot, so that the measuring apparatus in turn becomes hot, it is necessary to use heat resistant materials for constructing the measuring apparatus. Furthermore, the measuring coils must be protected from the hot propellant gases by appropriate housing means.

When using heat resistant materials this can cause the measuring apparatus to become sensitive to interfering magnetic fields, i.e. the measuring results obtained when using the measuring apparatus are sensitive to the direction in which the projectile is fired from the firing weapon. The measuring precision is impaired by such magnetic fields.

In order to be able to also measure the muzzle velocity of sabot type projectiles, the sabot of which disintegrates or detaches when the projectile exits from the weapon barrel, the measuring coils are mounted relatively close to the muzzle of the weapon barrel. Due to such arrangement the measuring coils are not damaged by the disintegrating sabot.

The smaller the spacing between the two measuring coils, the more precisely must there be measured the time interval between the two induction signals which are generated when the projectile passes through the measuring coils. It is for this reason that the terrestrial magnetic field has an unfavorable effect upon the measurement of the muzzle velocity of the projectile.

Furthermore, it is necessary to combine the measuring apparatus and the muzzle brake into a unit, so that both structures can be arranged as closely as possible to the muzzle of the weapon barrel.

Now in order to implement the aforementioned and still further objects of the invention, which will become more readily apparent as the description proceeds, the measuring apparatus of the present development is manifested by the features that the lengthwise axis of the measuring coil coincides with the lengthwise axis of the weapon barrel and the apparatus is simultaneously structured as a muzzle brake.

According to a further aspect of the invention and for the purpose of attachment of the measuring coils to the muzzle of the weapon barrel there is provided a support arrangement or support means composed of a material having a small magnetic permeability. In order to screen the equipment against disturbing or interfering magnetic fields, especially the gravitational magnetic field, there is provided a screen or shielding arrangement composed of one or a number of materials having a high magnetic permeability.

The invention further contemplates that the inner diameter of the measuring coil is dimensioned such that during the measurement of the muzzle velocity of sabot projectiles the disintegration or detachment of the sabot already can occur during the measuring operation.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components, and wherein.

DETAILED DESCRIPTION OF THE PREFERRED EMBODIMENTS

Figure 1:
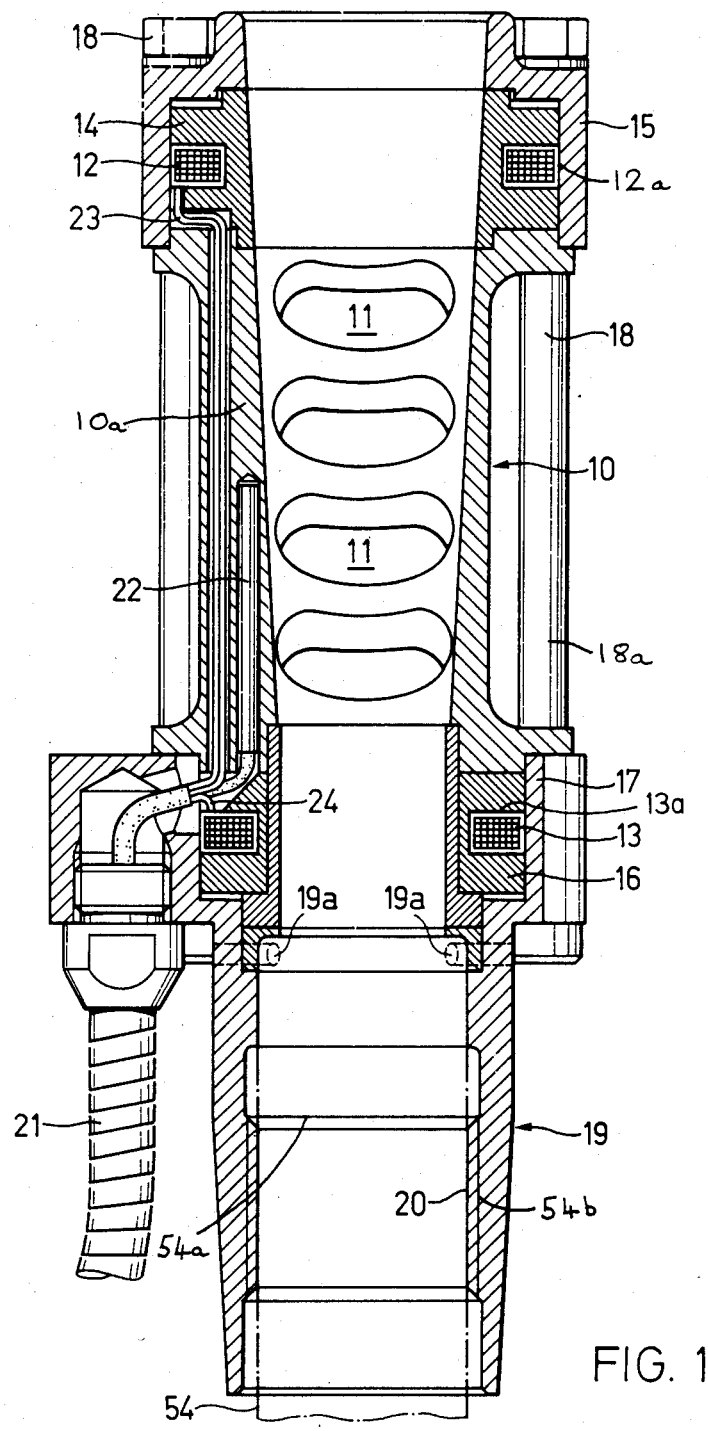
FIG. 1 is a longitudinal sectional view of a first embodiment of apparatus for measuring the muzzle velocity of projectiles and which apparatus represents a closed measuring base.

Describing now the drawings, it is to be understood that only enough of the construction of the measuring apparatus for measuring the muzzle velocity of projectiles has been shown as needed for those skilled in the art to readily understand the underlying principles and concepts of the present development, while simplifying the showing of the drawings. Turning attention now specifically to FIG. 1, there is shown therein a first exemplary embodiment of measuring apparatus according to the invention for measuring the muzzle velocity $V_0$ of a projectile fired out of a firing weapon or gun and this embodiment represents a closed measuring base. As will be evident from FIG. 1, the measuring apparatus contains a substantially conical tube member 10. The wall 10a of the substantially conical tube member 10 contains, for instance, eight openings or apertures 11 of which only four are visible in the illustration of FIG. 1. By means of these openings or apertures 11 the propellant gases which exit from the muzzle 54a of the weapon barrel 54 of the related weapon are laterally deflected, whereby the recoil of the weapon barrel 54 is braked. The substantially conical tube member 10 thus forms a recoil muzzle brake for the firing weapon which is not shown in any particular detail in FIG. 1 since its structure may be assumed to be conventional. FIG. 1 does depict, however, part of the weapon barrel 54 in combination with the inventive measuring apparatus for measuring the muzzle velocity of a fired projectile exiting from the weapon barrel 54.

At both ends of the substantially conical tube member 10, the measuring apparatus comprises a respective measuring coil 12 and 13, for instance induction coils. In accordance with the taper or conicity of the tube member 10 the front or forwardmost located induction coil 12 has a greater diameter than the rear or rearmost induction coil 13. Each induction coil 12 and 13 is arranged within a related circumferential groove 12a and 13a of a larger first ring member 14 and smaller first ring member 16, respectively. Each of these two ring members 14 and 16 is surrounded by a respective larger second ring member 15 and smaller second ring member 17. The substantially conical tube member 10 and the aforementioned four ring members 14, 15, 16 and 17 are interconnected by a number of threaded bolts 18, of which only two such threaded bolts 18 are particularly illustrated in FIG. 1. The second ring member 17 is formed integrally or of one-piece with a sleeve or sleeve member 19 which serves to mount the measuring apparatus at the muzzle 54a of the weapon barrel 54. This sleeve 19 is provided with internal threads or threading 20 and thus can be threadably connected to mating external threads or threading, generally indicated by reference character 54b, provided on the weapon barrel 54. Furthermore, a cable 21 or the like containing conductors or wires 23 and 24 is appropriately mounted to the second ring member 17. These conductors or wires 23 and 24 lead to the two induction coils 12 and 13 as well as to a temperature sensor or measuring device 22.

The measuring apparatus as described hereinbefore is preferably manufactured from austenitic steels due to the high temperatures of the propellant gases which exit from the muzzle 54a of the weapon barrel 54 and due to the high loads exerted thereat during its operation as a recoil brake. Austenitic steels possess a low magnetic permeability. For shielding or screening magnetic fields it is therefore necessary to arrange shielding or screening means operatively connected with the weapon barrel 54 and serving to shield or screen the entire apparatus. Such shielding or screening means may, for example, comprise a soft iron layer or cladding which surrounds the threaded bolts 18 or a soft iron core which is contained in the threaded bolts 18, as such expedients have been generally indicated by reference character 18a.

It is furthermore necessary to arrange a number of soft iron pins 19a or the like close to the muzzle 54a of the weapon barrel 54 which in conjunction with the aforementioned soft iron layer 18a of the threaded bolts 18 form the shielding or screening means for shielding or screening the measuring apparatus from undesired magnetic fields.

Figure 2:
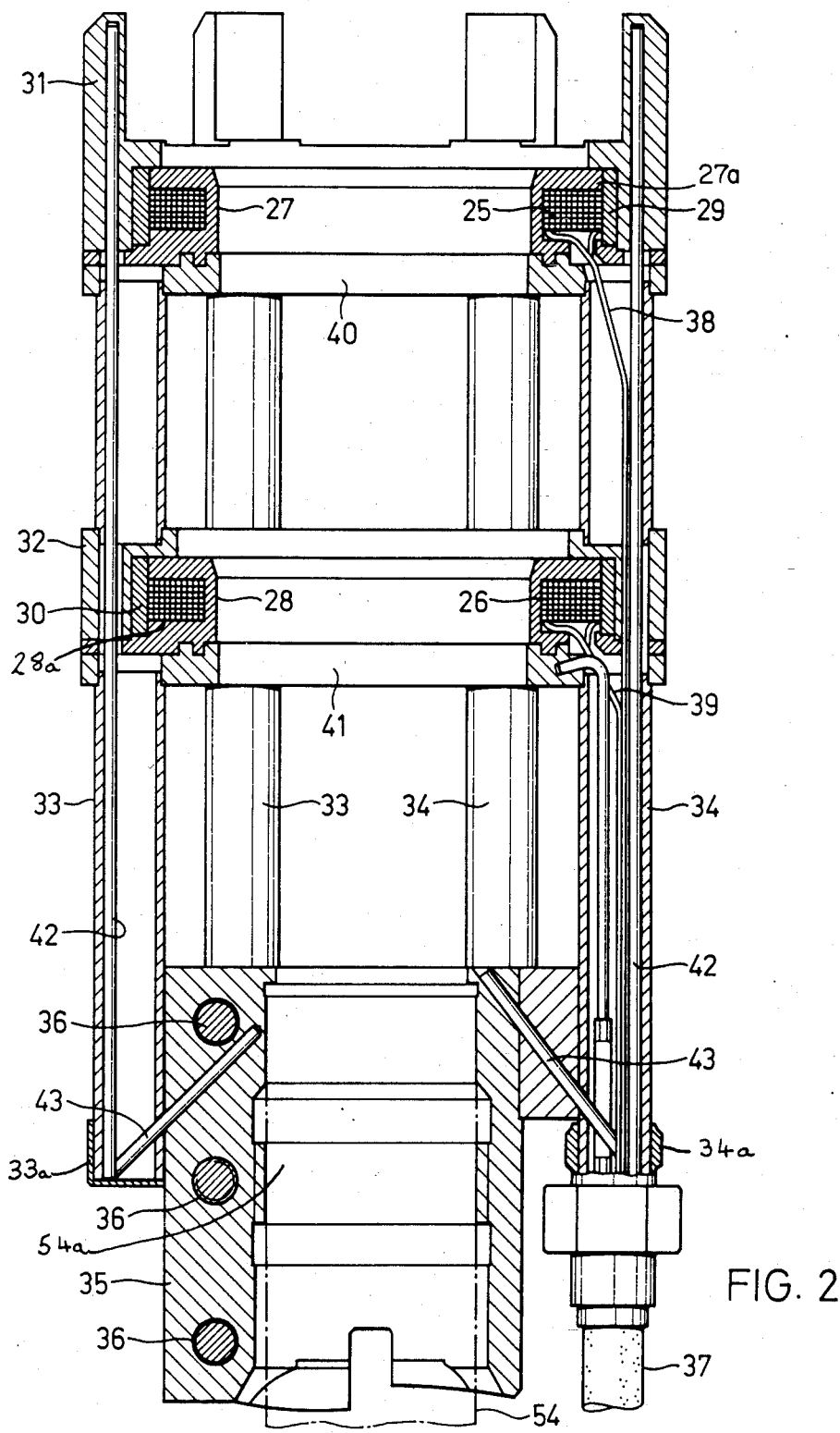
FIG. 2 is a longitudinal sectional view, analogous to the longitudinal sectional view of FIG. 1, depicting a second embodiment of measuring apparatus according to the invention for measuring the muzzle velocity of a projectile and which represents an open measuring base.

The second exemplary embodiment of measuring apparatus according to the invention for measuring the muzzle velocity of a projectile fired out of a suitable firing weapon represents an open measuring base and contains, as will be evident from FIG. 2, two measuring coils 25 and 26, for example induction coils 25 and 26 which have essentially the same diameter. Each of these two induction coils 25 and 26 is located within a related circumferential groove 27a and 28a of a first ring member 27 and 28. The two first ring members 27 and 28 are each surrounded by a respective second ring member 29 and 30 and, in turn, are each mounted in a respective third ring member 31 and 32. The two third ring members 31 and 32 are interconnected by a number of substantially tubular-shaped rods 33 and 34, of which only four rods 33 and 34 are illustrated in FIG. 2. Each of these rods 33 and 34 have a rear end 33a and 34a mounted at a sleeve member 35 which, in turn, is mounted to the muzzle 54a of a weapon barrel 54. For instance, three threaded bolts 36 or equivalent structure serve for mounting the sleeve or sleeve member 35 at the muzzle 54a of the weapon barrel 54, FIG. 2 only depicting such threaded bolts 36 in section. The sleeve 35 is thus solidly clamped to the muzzle 54a of the weapon barrel 54.

A cable 37 is secured to one of the rods 34. Electric conductors 38 and 39 pass through the hollow cable 37 and the related tubular-shaped rod 34 and lead to the two induction coils 25 and 26. At each one of the aforementioned first ring members 27 and 28 there is appropriately connected a respective annular or ring-shaped impact plate 40 and 41. The propellant gases which efflux from the muzzle 54a of the weapon barrel 54 are deflected by the impact plates 40 and 41, whereby the apparatus as heretofore described also is effective as a muzzle brake, and thus, does not only serve for measuring the muzzle velocity of the fired projectiles.

The apparatus shown in FIG. 2 also is preferably made of austenitic steels of low magnetic permeability. For shielding or screening interfering magnetic fields, particularly the terrestrial magnetic field, soft iron shielding or screening rods 42 are inserted into the tubular-shaped rods 33 and 34. The sleeve or sleeve member 35 also contains a number of soft iron shielding or screening rods 43, of which only two are particularly visible in FIG. 2.

The mode of operation of the measuring apparatus for measuring the muzzle velocity of a projectile fired out of a weapon can be assumed to be basically known and, therefore, need only be briefly described hereinafter. A projectile fired by the firing weapon, of which only the weapon barrel 54 has been conventionally illustrated, firstly passes through the rear induction coil 13 (FIG. 1) or 26 (FIG. 2) and generates a first induction signal or measuring pulse. Subsequently, the fired projectile passes through the front induction coil 12 (FIG. 1) or 25 (FIG. 2) and generates a second induction signal or measuring pulse. Knowing the spacing of the two induction coils 12 and 13 or 25 and 26 from one another and from the time interval between the two induction signals or pulses it is readily possible to determine the projectile velocity at the muzzle 54a of the weapon barrel 54. Since the apparatus is heated during the weapon firing operation the distance between the two induction coils 12 and 13 or 25 and 26 changes. In order to take into account the variations in distance between these coacting measuring coils when calculating the projectile velocity, the temperature of the tube member 10 is measured by means of the temperature sensor or measuring device 22.

However, the muzzle velocity of a projectile also can be measured by using a single measuring coil provided that the length of the projectile is known and there is then measured the time which expires between the entry of the projectile into and the exit of the projectile from such single measuring coil.

Figure 3:
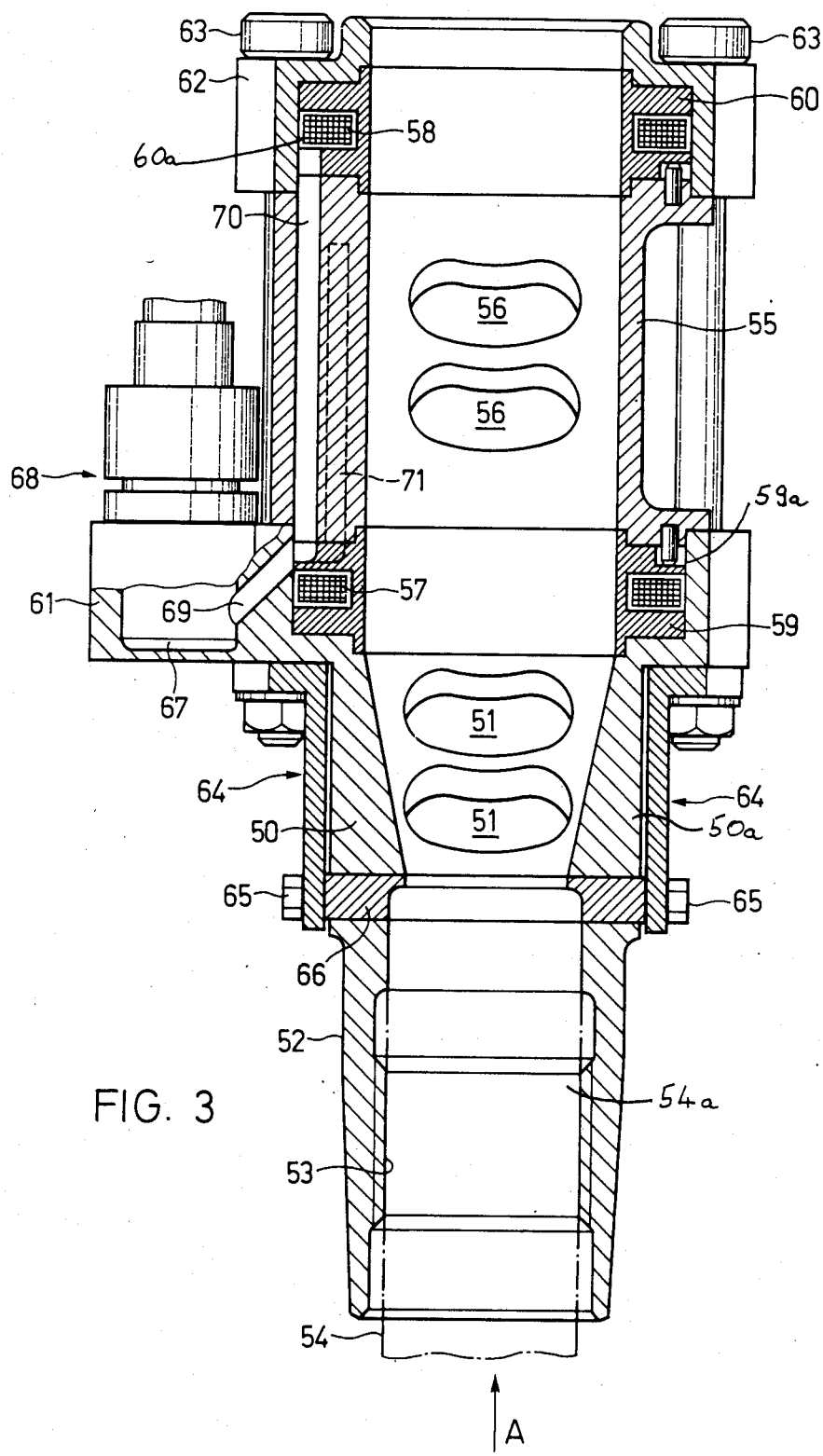
FIG. 3 is a longitudinal sectional view of a third embodiment of measuring apparatus according to the invention for measuring the muzzle velocity of a projectile and which apparatus represents a closed measuring base.
Figure 4:
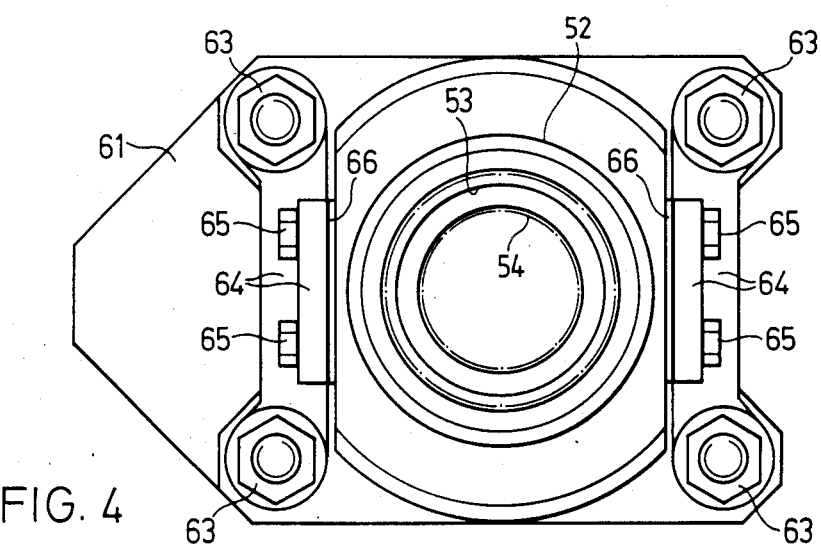
FIG. 4 is an end view of the measuring apparatus shown in FIG. 3 looking in the direction of the arrow A Of FIG. 3.

In the third exemplary embodiment of measuring apparatus according to the invention for measuring the muzzle velocity of a projectile fired out of a firing weapon the closed measuring base, as shown in FIGS. 3 and 4, contains a substantially conical further tube member 50 which is arranged rearwardly of one measuring coil 57 of two measuring coils 57 and 58 as viewed in the firing direction of the weapon. The wall 50a of the conical further tube member 50 contains four openings or apertures 51, of which only two are visible in FIG. 3, since the sectional view thereof shows only one-half of the further tube member 50. Beneath the openings or apertures 51 the substantially conical further tube member 50 comprises a substantially cylindrical tube section or portion 52 possessing internal threading or threads 53 for mounting the entire measuring base to a weapon barrel 54. In front of the conical further tube member 50, as seen in the firing direction, there is located a substantially cylindrical tube member 55 which also contains four openings or apertures 56, of which only two are visible. The propellant gases which exit from the muzzle 54a of the weapon barrel 54 are laterally deflected by the eight openings or apertures 51 and 56, whereby the recoil of the weapon barrel 54 is braked. A respective measuring coil 57 and 58 is arranged at each of the two opposite ends of the cylindrical tube member 55. Each of these measuring coils 57 and 58 is located in a circumferential groove 59a and 60a of a respective ring member 59 and 60. At its upper end the conical further tube member 50 comprises a first flange or flange member 61 in which there is located the aforementioned ring member 59. The other aforementioned ring member 60 is surrounded by a second flange or flange member 62 which is mounted upon the upper end of the substantially cylindrical tube member 55.

The heretofore described members, namely the substantially conical further tube member 50, the substantially cylindrical tube 55, the second flange 62 and the two ring members 59 and 60 including the two measuring coils 57 and 58 are held together by, for instance, four threaded bolts 63 or equivalent structure. The entire measuring base is reinforced by two further reinforcing plates or plate members 64 which, on the one hand, are secured by the previously mentioned four threaded bolts 63 to the first flange or flange member 61 of the conical further tube member 50 and which, on the other hand, are interconnected by means of two threaded bolts 65 or the like and a respective connecting plate 66. The aforementioned first flange 61 additionally comprises a bore 67 into which there is screwed or otherwise suitably fixed a socket 68. Electric conductors or lines, which are not shown in any particular detail, pass through the socket or socket member 68 and lead to the two measuring coils 57 and 58. Further bores 69 and 70 are provided in the first flange or flange member 61 and in the substantially cylindrical tube member 55, respectively, for the throughpassage of such electric conductors. Furthermore, a temperature sensor or feeler arrangement 71 is located in the cylindrical tube member 55.

Figure 5:
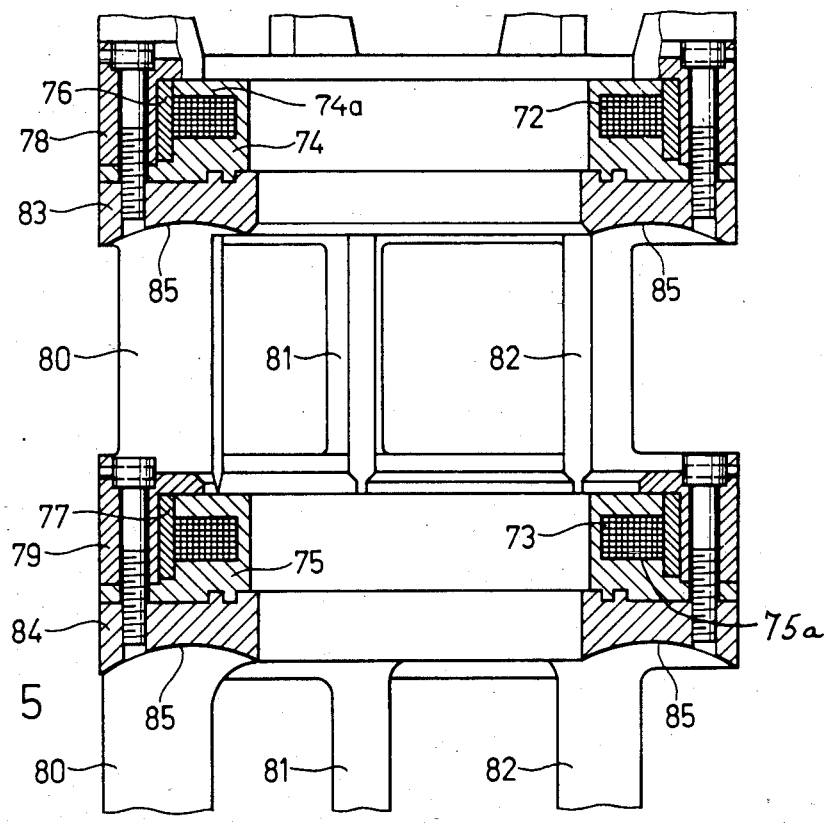
FIG. 5 is a longitudinal sectional view of a fourth embodiment of measuring apparatus according to the invention for measuring the muzzle velocity of a projectile and represents an open measuring base.

The open measuring base of the fourth exemplary embodiment of measuring apparatus according to the invention for measuring the muzzle velocity of a projectile fired out of a firing weapon contains, as well be apparent from FIG. 5, two induction or measuring coils 72 and 73 of essentially the same diameter. Each of these two induction or measuring coils 72 and 73 is located in a circumferential groove 74a and 75a of a respective first ring member 74 and 75. Each of these two first ring members 74 and 75 is surrounded by a respective second ring member 76 and 77, each of which is secured to a respective third ring member 78 and 79. The two third ring members 78 and 79 are interconnected by a number of rods 80, 81 and 82, of which only three are particularly shown in FIG. 5. A respective annular or ring-shaped impact plate 83 and 84 is appropriately secured to each one of the aforementioned first ring members 74 and 75. The propellant gases which exit from the muzzle 54a of the weapon barrel 54 are deflected by these impact plates 83 and 84, whereby the heretofore described apparatus also is effective as a muzzle brake. However, in comparison to the embodiment as previously described with reference to FIG. 2 of the drawings, the fourth embodiment shown in FIG. 5 essentially differs by the provision of the concave recesses or depressions 85 which improve upon the deflection of the propellant gases. Additionally, the rods 80, 81 and 82 are combined with the impact plates 83 and 84 to form an integrated cast member.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. An apparatus for measuring the muzzle velocity of a projectile fired out of a weapon which possesses a weapon barrel having a muzzle and defining a weapon barrel axis, comprising:

at least one measuring coil defining a coil axis;

said coil axis of said measuring coil substantially coinciding with said weapon barrel axis;

at least one ring member;

said at least one measuring coil being located within said at least one ring member;

said at least one ring member being mounted in an open spaced relationship at a predetermined distance from the muzzle of the weapon; and muzzle brake means comprising at least one impact plate secured to said at least one ring member for laterally and outwardly deflecting propellant gases discharged from said muzzle of said weapon barrel when said projectile is fired out of said weapon.

2. The apparatus as defined in claim 1, further including:

mounting means for mounting the at least one measuring coil and said at least one ring member at said muzzle of said weapon barrel;

said mounting means and said at least one ring member being formed of a material having a relatively low magnetic permeability;

said mounting means containing magnetic shielding means shielding said at least one measuring coil from interfering magnetic fields; and said magnetic shielding means being formed by at least one material of relatively high magnetic permeability.

3. The apparatus as defined in claim 2, wherein:

said magnetic shielding means comprising a number of materials having relatively high magnetic permeability.

4. The apparatus as defined in claim 2, wherein:

said mounting means comprise substantially tubular-shaped rods made of an austenitic type steel;

said magnetic shielding means comprise rods made of soft iron; and said rods made of soft iron being located within said tubular-shaped rods.

5. The apparatus as defined in claim 1, wherein:

said at least one measuring coil and said at least one ring member associated therewith each have an inner diameter;

said rpojectile fired out of said weapon, containing a sabot which disintegrates upon discharge thereof from said muzzle of said weapon; and said inner diameters of said at least one measuring coil and the at leat one ring member associated therewith, being dimensioned such that disintegration of said sabot can occur already during measurement of said muzzle velocity of said sabot type projectile when said sabot type projectile is fired out of said weapon.

6. The apparatus as defined in claim 1, wherein:

said muzzle brake means contain a sleeve member secured to the muzzle of said weapon;

said sleeve member containing magnetic shielding means for shielding said at least one magnetic coil from interfering magnetic fields; and said magnetic shielding means comprising soft iron rods arranged in said sleeve member close to said muzzle of said weapon.

* * * * *

UNITED STATES PATENT AND TRADEMARK OFFICE
CERTIFICATE OF CORRECTION

PATENT NO. : 4,677,376

DATED : June 30, 1987

INVENTOR(S) : GODWIN ETTEL et al

It is certified that error appears in the above-identified patent and that said Letters Patent is hereby corrected as shown below:

Column 1, line 59, please delete "approved" and insert --improved--

Column 8, line 19, please delete "rpojectile" and insert --projectile--

Signed and Sealed this

Sixteenth Day of February, 1988

Attest:

DONALD J. QUIGG

Attesting Officer

Commissioner of Patents and Trademarks